United States Patent
Shan et al.

(10) Patent No.: US 11,023,473 B2
(45) Date of Patent: Jun. 1, 2021

(54) RECURRENT BINARY EMBEDDING FOR INFORMATION RETRIEVAL

(71) Applicant: Microsoft Technology Licensing, LLC, Redmond, WA (US)

(72) Inventors: Ying Shan, Sammamish, WA (US); Jian Jiao, Bothell, WA (US); Jie Zhu, Bellevue, WA (US); Jianchang Mao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 16/017,817

(22) Filed: Jun. 25, 2018

(65) Prior Publication Data

US 2019/0251184 A1 Aug. 15, 2019

Related U.S. Application Data

(60) Provisional application No. 62/628,843, filed on Feb. 9, 2018.

(51) Int. Cl.
| | |
|---|---|
| *G06F 16/2457* | (2019.01) |
| *G06F 7/16* | (2006.01) |
| *G06N 3/04* | (2006.01) |
| *G06N 3/063* | (2006.01) |
| *G06N 3/08* | (2006.01) |
| *G06F 16/2455* | (2019.01) |

(52) U.S. Cl.
CPC ......... *G06F 16/24578* (2019.01); *G06F 7/16* (2013.01); *G06F 16/2455* (2019.01); *G06N 3/0445* (2013.01); *G06N 3/0454* (2013.01); *G06N 3/063* (2013.01); *G06N 3/08* (2013.01)

(58) Field of Classification Search
CPC .. G06F 16/24578; G06F 16/2455; G06F 7/16; G06N 3/0445; G06N 3/0454; G06N 3/063; G06N 3/08
See application file for complete search history.

(56) References Cited

U.S. PATENT DOCUMENTS

| | | | |
|---|---|---|---|
| 9,117,227 B1 * | 8/2015 | Agrawal | G06Q 30/0242 |
| 2010/0311033 A1 * | 12/2010 | Jain | G09B 7/00 434/362 |

(Continued)

OTHER PUBLICATIONS

Aggarwal, et al., "On the surprising behavior of distance metrics in high dimensional spaces", In International Conference on Database Theory, vol. 1, Jan. 4, 2001, pp. 420-434.

(Continued)

*Primary Examiner* — Alford W Kindred
*Assistant Examiner* — Cao D Vuong
(74) *Attorney, Agent, or Firm* — Rainier Patents, P.S.

(57) ABSTRACT

A computational search method for retrieving computer information related to a query includes transforming a plurality of candidate answers to candidate answer recurrent binary embedding (RBE) embeddings using a trained RBE model. A query is transformed to a query RBE embedding using the trained RBE model. The query RBE embedding is compared to each candidate answer RBE embedding of a plurality of candidate answer RBE embeddings using a similarity function. The candidate answers are sorted based on the comparisons made using the similarity function, and returning a plurality of the top candidate answers.

20 Claims, 8 Drawing Sheets

(56) References Cited

U.S. PATENT DOCUMENTS

| | | | |
|---|---|---|---|
| 2016/0042296 A1* | 2/2016 | Shan | G06F 16/3329 706/11 |
| 2017/0228376 A1* | 8/2017 | Noma | G06K 9/00885 |
| 2018/0157989 A1* | 6/2018 | Green | G06N 20/00 |
| 2018/0260415 A1* | 9/2018 | Gordo Soldevila | G06F 16/583 |
| 2018/0341720 A1* | 11/2018 | Bhatia | G06N 5/003 |

OTHER PUBLICATIONS

Alemdar, et al., "Ternary neural networks for resource-efficient AI applications", In Proceedings of International Joint Conference on Neural Networks, May 14, 2017, 9 Pages.

Bengio, et al., "Estimating or Propagating Gradients Through Stochastic Neurons for Conditional Computation", In Journal of Computing Research Repository, Aug. 2013, pp. 1-12.

Blei, et al., "Latent Dirichlet Allocation", In the Journal of machine Learning research, vol. 3, Jan. 2003, pp. 993-1022.

Cao, et al., "Hash-Net: Deep Learning to Hash by Continuation", In Journal of Computing Research Repository, Feb. 2017, pp. 1-11.

Courbariaux, et al., "Binarized neural networks: Training deep neural networks with weights and activations constrained to+ 1 or-1", In Journal of Computing Research Repository, Feb. 2016, 11 Pages.

Datar, et al., "Locality sensitive hashing scheme based on p-stable distributions", In Proceedings of the twentieth annual symposium on Computational geometry, Jun. 9, 2004, pp. 253-262.

Deerwester, et al., "Indexing by Latent Semantic Analysis", In Journal of the American Society for Information Science, vol. 41, Issue 6, Sep. 1990, pp. 391-407.

Edelman, et al., "Internet advertising and the generalized second price auction: Selling billions of dollars worth of keywords", In Technical Report of National Bureau of Economic Research, Nov. 2005, 22 Pages.

Friedman, et al., "An Algorithm for Finding Best Matches in Logarithmic Expected Time", In Journal of ACM Transactions on Mathematical Software, vol. 3, No. 3, Sep. 1977, pp. 209-226.

Friesen, et al., "Deep Learning as a Mixed Convex-Combinatorial Optimization Problem", In Journal of Computing Research Repository, Oct. 2017, pp. 1-14.

He, et al., "Deep residual learning for image recognition", In Proceedings of IEEE Conference on Computer Vision and Pattern Recognition, Jun. 27, 2016, pp. 770-778.

Hofmann, Thomas, "Probabilistic Latent Semantic Indexing", In Proceedings of the 22nd Annual International SIGIR Conference Research and Development in Information Retrieval, Aug. 1999, pp. 50-57.

Huang, et al., "Learning Deep Structured Semantic Models for Web Search using Clickthrough Data", In Proceedings of the 22nd ACM International Conference on Information & Knowledge Management, Oct. 27, 2013, pp. 2333-2338.

Jegou, et al., "Product quantization for nearest neighbor search", In Journal of IEEE transactions on pattern analysis and machine intelligence vol. 33, Issue 1, Jan. 2011, pp. 1-14.

Johnson, et al., "Billion-scale similarity search with GPUs", In Journal of Computing Research Repository, Feb. 2017, pp. 1-12.

Li, et al.,"Brute-force k-nearest neighbors search on the GPU", In International Conference on Similarity Search and Applications, Oct. 12, 2015, pp. 1-12.

Merrill, et al., "Revisiting sorting for GPGPU stream architectures", In Proceedings of the 19th international conference on Parallel architectures and compilation techniques, Sep. 11, 2010, pp. 545-546.

Mikolov, et al., "Distributed Representations of Words and Phrases and their Compositionality", In Proceedings of 27th Annual Conference on Neural Information Processing Systems, Dec. 5, 2013, pp. 1-9.

Mikolov, et al., "Efficient Estimation of Word Representations in Vector Space", In Journal of Computing Research Repository, Jan. 2013, pp. 1-12.

Muja, et al., "Scalable nearest neighbor algorithms for high dimensional data", In Journal of IEEE Transactions on Pattern Analysis and Machine Intelligence vol. 36, Issue 11, Nov. 2014, pp. 1-14.

Rastegar, et al., "Xnor-Net: Imagenet classification using binary convolutional neural networks", In Proceedings of European Conference on Computer Vision, Oct. 8, 2016, pp. 1-17.

Robertson, et al., "The probabilistic relevance framework: BM25 and beyond", In Journal of Foundations and Trends in Information Retrieval, vol. 03, Issue 4, Apr. 2009, pp. 333-389.

Salakhutdinov, et al., "Semantic Hashing", In IRGM Workshop at the SIGIR Conference, Jun. 2007, 8 Pages.

Salton, et al., "A Vector Space Model for Automatic Indexing", In Communications of the ACM, vol. 18, Issue 11, Nov. 1, 1975, pp. 613-620.

Sanderson, et al., "The history of information retrieval research", In Proceedings of IEEE 100, Special Centennial Issue, May 13, 2012, 10 Pages.

Shen, et al., "A latent semantic model with convolutional-pooling structure for information retrieval", In Proceedings of the 23rd ACM International Conference on Conference on Information and Knowledge Management, Nov. 3, 2014, 10 Pages.

Tang, et al., "Efficient selection algorithm for fast k-nn search on gpus", In Proceedings of IEEE International Parallel and Distributed Processing Symposium, May 25, 2015, pp. 397-406.

Wang, et al., "Query-driven Iterated Neighborhood Graph Search for Large Scale Indexing", In Proceedings of the 20th ACM International Conference on Multimedia, Oct. 29, 2012, pp. 179-188.

Weber, et al., "A quantitative analysis and performance study for similarity-search methods in high-dimensional spaces", In Proceedings of the 24rd International Conference on Very Large Data Bases, Aug. 24, 1998, pp. 194-205.

Wei, et al., "LDA-based Document Models for Ad-hoc Retrieval", In Proceedings of the 29th Annual International ACM SIGIR Conference on Research and Development in Information, Aug. 6, 2006, pp. 178-185.

Wieschollek, et al., "Efficient large-scale approximate nearest neighbor search on the gpu", In Proceedings of the IEEE Conference on Computer Vision and Pattern Recognition., Jun. 27, 2016, pp. 2027-2035.

Yu, et al., "Precision weightingan-effective automatic indexing method", In Journal of the ACM, vol. 23, Issue 1, Jan. 1976, pp. 76-88.

* cited by examiner

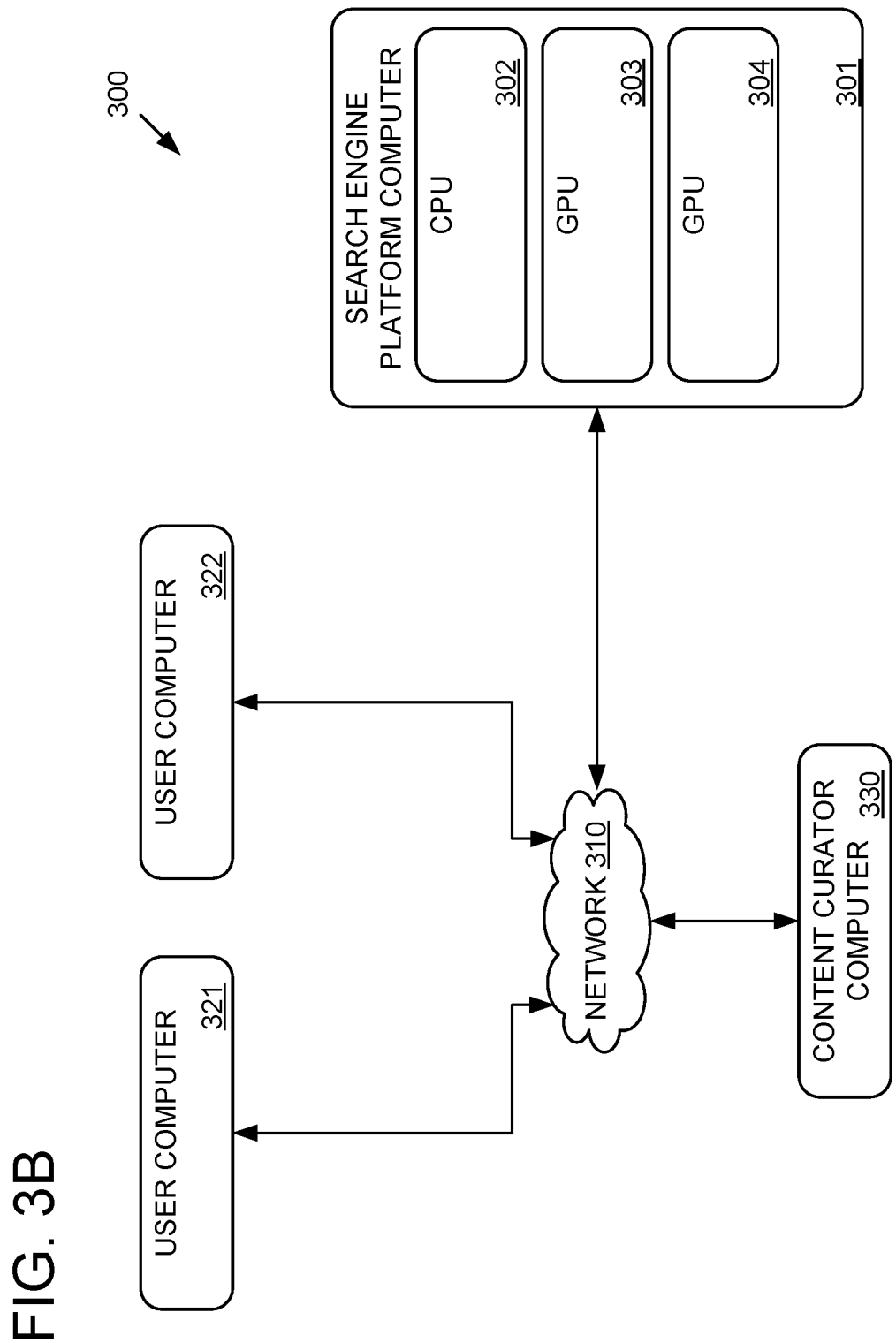

FIG. 4A

```
4000: BrainScriptNetworkBuilder = [
4001: StraightThroughLayer (m, n) = [
4002:   W = ParameterTensor {(m:n), init =' glorotUniform '}
4003:   b = ParameterTensor {m, initValue =0}
4004:   apply (x) = StraightThrough (W*x+b)
4005: ]
4006:
4007: RBEUnit (EDim , BDim , ResidualWeight , InNode , EmbeddingNode ) = {
4008:   ReconstructedNode = DenseLayer {EDim , activation =Tanh , bias = true }( InNode )
4009:   ResidualNode = Minus ( EmbeddingNode , ReconstructedNode )
4010:   ResidualBinaryNode = StraightThroughLayer {BDim , EDim }( ResidualNode )
4011:   RBEUnit = Plus ( inBinaryNode , residualBinaryNode .* ResidualWeight )
4012: }. RBEUnit
4013:
4015: numHiddenNodes = 288
4014: numBits = 64
4016: Label = Input ( LabelDim )
4017: qemb = the output of the multi - layers for query as in Fig .2
4018: kemb = the output of the multi - layers for keyword as in Fig .2
4019:
4020: qb0 = StraightThroughLayer { numBits , numHiddenNodes }( qemb )
4021: qb1 = RBEUnit ( numHiddenNodes , numBits , CONST_HALF , qb0 , qemb )
4022: qb2 = RBEUnit ( numHiddenNodes , numBits , CONST_QUARTER , qb1 , qemb )
4023:
4024: kb0 = StraightThroughLayer { numBits , numHiddenNodes }( kemb )
4025: kb1 = RBEUnit ( numHiddenNodes , numBits , CONST_HALF , kb0 , kemb )
4026:
4027: # Constant parameters are from CNTK CDSSM tutorial
4028: lf = Times ( CONST_PAD , Label )
4029: c = CosDistanceWithNegativeSamples (qb2 , kb1 , CONST_SHIFT , CONST_NEG )
4030: s = Slice (0, 1, c, axis =1, tag =" output ")
4031: ce = CrossEntropyWithSoftmax (lf , Scale ( CONST_GAMMA , c), tag =" criterion ")
4032:]
```

FIG. 4B

**The *k*-NN Kernel**

Input: The RBE vector for the query $b_q^u$
The RBE vectors for keywords $b_{k,j \in \Omega_y}^v$

Output: Priority queue $p$ containing top similarity scores and their indices 401  $z \leftarrow x * T_b * I + y$ ;
402  $p.\text{clear}()$ ;
403  for $i \leftarrow 1$ *to* $I$ do
404      $s \leftarrow \cos(b_q^u, b_{k,z}^v)$ ;
405      $p.\text{insert}(s, z)$ ;
406      $z \leftarrow z + T_b$ ;
407  end
408  return $p$ ;

RECURRENT BINARY EMBEDDING FOR INFORMATION RETRIEVAL

CROSS REFERENCE TO RELATED APPLICATIONS

This application claims priority to U.S. Provisional Patent Application Ser. No. 62/628,843, filed Feb. 9, 2018, the entirety of which is hereby incorporated herein by reference for all purposes.

BACKGROUND

Users of computer systems frequently engage in information retrieval tasks, e.g., internet search. Retrieving a relevant answer to a query may depend on semantic relationships between the answer and the query. Machine learning techniques may be used to generate semantic embeddings of answers and queries. However, searching for a semantic embedding of a relevant answer based on a semantic embedding of a question may present a large computational burden, limiting the number of candidate answers and/or queries that may be processed by an information retrieval system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computational search method for retrieving computer information related to a query includes transforming a plurality of candidate answers to candidate answer recurrent binary embedding (RBE) embeddings using a trained RBE model. A query is transformed to a query RBE embedding using the trained RBE model. The query RBE embedding is compared to each candidate answer RBE embedding of a plurality of candidate answer RBE embeddings using a similarity function. The candidate answers are sorted based on the comparisons made using the similarity function, and returning a plurality of the top candidate answers.

BRIEF DESCRIPTION OF THE DRAWINGS

FIG. 3B shows a computing environment suitable for implementing a GPU-enabled information retrieval system.

FIG. 4A is a code listing for an exemplary implementation of a training procedure for a recurrent binary embedding model.

FIG. 4B is an algorithm listing defining an exemplary GPU kernel function for exhaustively matching a query against a plurality of candidate answers.

DETAILED DESCRIPTION

Figure 1:
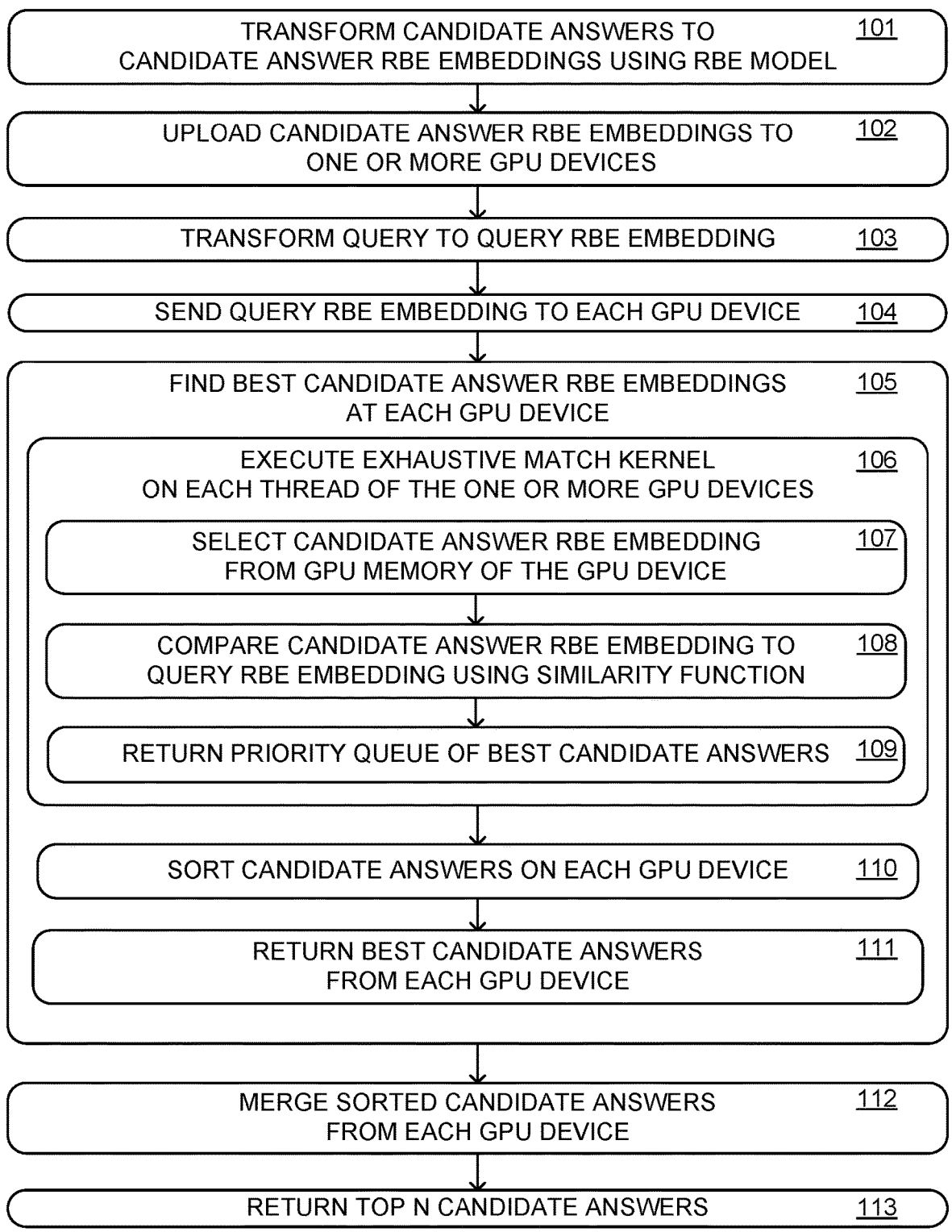
FIG. 1 shows an exemplary method for GPU-enabled information retrieval using recurrent binary embeddings.

Information retrieval (IR) is ubiquitous and is at the heart of modern applications including web search, online advertising, product recommendations, digital assistants, and personalized feeds. IR often requires a very large amount of computational resources. As such, it may be advantageous to perform IR processing on a specialized computing device with a large computational throughput, such as a computer system including a graphical processing unit (GPU), in order to reduce a latency of the IR processing. However, IR tasks also often require a large amount of data to be stored in memory, which may exceed the storage capacity of a GPU device. Approaches to work around this excessive memory requirement may result in an unacceptable latency which eliminates any performance gained by using a GPU. For example, processing the data on a single GPU in multiple batches may incur a latency and increase in power consumption, as data is transferred from main memory of a CPU to memory of the GPU via a system bus. Processing the data on multiple GPUs may similarly incur a latency and increase in power consumption, as data is transferred to and from the GPUs. Furthermore, conventional algorithms that are not specifically developed for the GPU(s) may not satisfactorily translate to operate on the GPU, which may substantially increase complexity of an implementation.

In an example, IR may be used in the context of a search engine to retrieve relevant answers to a query. In some examples, a search engine may be able to obtain a mixture of organic search results (e.g., indicating $3^{rd}$ party content indexed by the search engine) and curated search results (e.g., indicating curated content provided by the purveyor of the search engine or an affiliate of the purveyor). Curated content may include any suitable content which may be relevant to the query, e.g., curated selections of popular content from among organic search results, reference documents (e.g., technical documentation or encyclopedia entries), news articles and announcements, and/or advertisements. As compared to organic search results, curated search results may be exhaustively known to the search provider (e.g., stored in a database). Furthermore, as compared to organic search results, the search provider may have a superior ability to assess quality and/or relevance of curated search results. Accordingly, the quality of a set of search results may be improved by including curated search results instead of or in addition to organic search results.

A curated search may include an interaction between a user, a content curator, and the search engine platform. The goal of the search engine platform is to display a list of curated content items that best match a user's intent, as defined by a query provided by the user as input to the search engine platform.

A query may be a text string that expresses user intent (e.g., a search word or phrase typed into a search box of the search engine), or any other suitable indication of user intent (e.g., inking input including user handwriting, or an audio clip of user speech).

The search engine platform may process the query to determine one or more candidate answers. A candidate answer is a result indicating a potentially relevant content item (e.g., a curated content item). The candidate answer may include any suitable indication of the content item. For example, a candidate answer may include a keyword, e.g., a text string that describes the content item. The candidate answer may be presented to the user directly, e.g., by displaying the keyword. Alternately or additionally, the candidate answer may indicate one or more curated content items which are likely relevant to the user's query. Accordingly, a candidate answer may be further processed by the content curator and/or search engine platform, in order to visually present an indication of the candidate answer to the user (e.g., by generating and visually presenting text, audio, and/or images). The presentation of a candidate answer to the user (e.g., on the result page of the search engine) may be referred to herein as an "impression" of the candidate answer.

When the user selects an impressed candidate answer (e.g., in order to view the associated content), the search engine platform may receive an indication of a user selection of a candidate answer. Responsive to receiving the indication of user selection, the search engine platform may be able to modify the results of future searches by the user or any other user in order to improve quality of the results (e.g., to improve relevance of candidate answers of the future searches).

The number of curated content items available as candidate answers of an IR system (e.g., a search engine) may be at the scale of billions (herein referred to as billion-scale IR). In contrast, the number of candidate answers that may be presented to the user is typically much smaller (e.g., at the scale of tens or hundreds). When the number of candidate answers is too large, a user may experience difficulty assessing the candidate answers and selecting a relevant answer. Furthermore, processing a large number of candidate answers (e.g., to visually present curated content associated with the candidate answers) may entail a large amount of processing time, storage space, and power consumption at the user's computer, computers of the search engine platform, and computers of the content curator. Accordingly, achieving a good user experience with the search platform may require filtering the number of candidate answers to a suitable number (e.g., a number of results that will be presented to a user on a single web page). Accordingly, IR technologies may be applied to reduce the amount of candidate answers sent to the content curator and/or user computer, by retrieving a limited number of candidate answers which may be more likely to be relevant than other candidate answers.

IR techniques may be facilitated by representing information content (e.g., text) as semantic embeddings generated by deep neural networks (DNNs). For example, a DNN may be configured to receive a content item and generate an embedding vector. The DNN may be trained to improve the quality of generated embedding vectors, based on user selection of a candidate answer with regard to a query. The use of user data may enable a discriminative objective function that may be optimized for differentiating relevant answers from irrelevant candidate answers. For example, the IR system may be trained in "end-to-end" fashion, wherein the DNN and other components of the IR system are tightly coupled so that parameters of the IR system (e.g., including weights of the DNN) may be simultaneously optimized based on performance of the IR system. Accordingly, the DNN approach may lead to significant performance gains as compared with previous models using objectives that were only loosely coupled with IR tasks. In some examples, DNNs may incorporate word sequence features through a convolution-pooling structure. DNNs incorporating word sequence features in this manner include convolutional latent semantic models (CLSM) and/or deep structured semantic models (DSSM), such as convolutional deep structured semantic models (CDSSM).

Semantic embedding of information content may result in a richly expressive representation of the information content, which may facilitate classifying, comparing, and/or generating the information content by comparing the semantic embeddings. For example, semantic embeddings may represent points in a linear algebraic and/or topological latent space learned by the semantic model. Accordingly, the spatial relationships among points in the latent space may correspond to semantic relationships in the information content (e.g., two words which are synonyms or which express similar sentiment within a context may be embedded to points which are close within the latent space). However, methods based on high dimensional vectors (e.g., online retrieval of embedding vectors) may require solving a high-dimensional k-nearest neighbor (k-NN) problem. Solving the k-NN problem may present a large technical burden in terms of memory space required to store the vectors and run time required to assess the vectors. As such, working with semantic embeddings involves striking a balance among retrieval performance, speed, and memory consumption. Furthermore, when dimensionality of the vectors is large, it may be difficult to obtain sufficient example data to generate and/or evaluate the semantic embeddings (a phenomenon known as the "curse of dimensionality"). As such, the k-NN problem may be too computationally intensive to solve in a practical amount of time using conventional CPUs. High-throughput computing devices such as GPUs may be used to decrease a latency of a computationally intensive problem. However, the k-NN problem with high-dimensional vectors may require storing too much data to be operable even on state-of-the-art GPUs.

Accordingly, the present disclosure provides an IR system which utilizes a novel semantic embedding model referred to herein as Recurrent Binary Embedding (RBE), which is designed to meet the above challenge. RBE extends a neural network model to generate efficient representations of embedding vectors output by the neural network model. The RBE representation is compact enough to fit embedding vectors representing over a billion candidate answers into the memory of a relatively small number (e.g., 1, 2, 3, or 4) of consumer grade GPUs. Furthermore, the similarity computation of RBE embeddings can fully utilize a single-instruction, multiple threads (SIMT) architecture, to the extent that a k-NN selection algorithm based on exhaustive match is feasible for real-time retrieval. In this exhaustive match approach, the query is matched against every candidate answer. Accordingly, the present disclosure further provides a method for IR herein referred to as RBE for GPU-enabled information retrieval (rbeGIR). An rbeGIR system according to the present disclosure may provide for efficient IR using a small number of GPUs, and accordingly may be implemented in a practical, self-contained computer system. Alternately or additionally, an rbeGIR system may be implemented on a computer cluster including a large number of GPUs (e.g., in order to process a large number of IR queries simultaneously).

Exhaustive matching may reduce an effect of the "curse of dimensionality" as compared to alternative approaches such as approximate nearest-neighbor (ANN) approaches, because if there is any exact match for the query among the candidate answers, it will always be compared to the query so that the match can be found. Furthermore, even if an exact match is not present, finding a closest match among all of the possible candidate answers will likely still result in a high-quality match. The present disclosure enables exhaustive k-NN to be applied to IR even when there are billions of candidate answers. Furthermore, the retrieval accuracy can be optimized based on hardware capacity (e.g., based on total memory provided by one or more GPUs). Accordingly, it is believed that the results achieved by the present disclosure will scale with future improvements to GPU technology.

Compared to binary DNNs, RBE improves accuracy through structural innovation and adds significant gains on top of the best binarization algorithm. Other approaches for k-NN selection of high-dimensional vectors include approximated nearest-neighbor (ANN) algorithms such as KD-tree, the FLANN package, neighborhood graph search, and locality sensitive hashing. Unlike these algorithms, RBE may enable exhaustive search that is not subject to the curse of dimensionality. As compared with other exhaustive k-NNs that have the same property, it may handle billions of candidate answers. In contrast, existing methods may only be able to handle data scale in the millions or smaller, even with the help of GPUs. Another recent ANN, product quantization (PQ), has been applied in a billion-scale IR system on GPU. However, in order to achieve speed and memory efficiency, PQ-based approaches may drastically sacrifice the resolution of the learned representation, and may rely on lossy indexing structures. In contrast, the rbeGIR system relies on a near lossless k-NN, and a compact representation with high and easy to control accuracy. Moreover, rbeGIR does not require indexing structures that would require extensive memory.

FIG. 1 depicts a method 100 for IR (e.g., query answering) based on rbeGIR according to the present disclosure. Method 100 may be performed by a search engine computing platform including one or more GPUs.

At 101, method 100 includes transforming candidate answers to a representation in RBE embeddings using an RBE model. For example, each of a billion or more candidate answers may be pre-processed by a computer cluster including one or more GPUs, thereby transforming each of the candidate answers into a very data efficient binary vector representation. The binary representation may facilitate efficient storage of the billion or more vectors, as well as efficient mathematical operations on the vectors, which may facilitate a large-scale IR system.

Figure 2A:
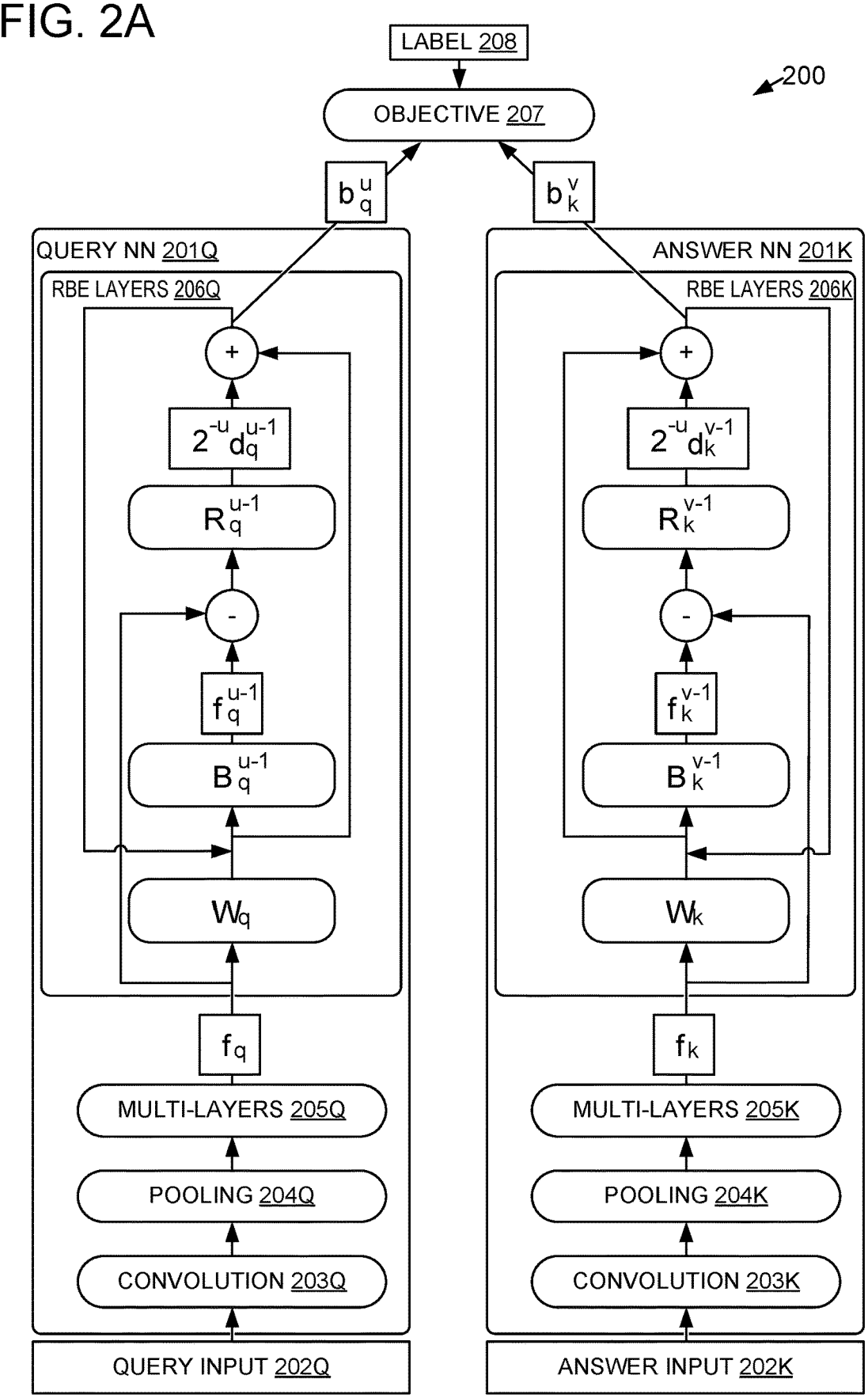
FIG. 2A shows an exemplary model architecture for a recurrent binary embedding system.

FIG. 2A depicts an exemplary neural network architecture of an RBE model 200 useable to transform candidate answers to an RBE representation. The RBE model 200 includes two parallel feed-forward networks (e.g., CLSM networks, DSSM networks, and/or CDSSM networks): a query neural network 201Q and a candidate answer neural network 201K. Note that values associated with components of the query neural network 201Q (e.g., $f_q$) are labelled with a subscript q, whereas components of the candidate answer neural network 201K are labelled with a subscript k.

During operation of the neural networks to evaluate a query and/or answer, data is generally fed forward among components of the neural networks, in a direction from the components shown at the bottom of FIG. 2A towards the components shown at the top of FIG. 2A (as indicated by the arrows). However, as will be described below, data is also fed backward among the components (along arrows that run from the top towards the bottom) to recurrently construct the RBE representation for a given timestep, based on values computed in the neural networks at a previous timestep. Additionally, while training the RBE model 200, data may be fed backward among the components, opposite to the direction of each arrow, e.g., according to the backpropagation algorithm for training neural networks.

The query neural network comprises a stack of neural network layers, including a query input layer 202Q, transformation layers (including convolution layer 203Q, pooling layer 204Q, and multiple hidden feed-forward layers (multi-layers) 205Q), and additional layers for performing recurrent binary encoding, hereinafter referred to as RBE layers 206Q. In an example, query features received and processed starting at the query input layer 202Q may include a sparse letter trigram representation (e.g., 3-shingling at the letter level). In other examples, any other suitable query features may be used (e.g., based on text, inking input, speech audio input, pictures, or any other suitable input by which a user may specify a query). The query features are mapped to a real-valued vector $f_q$, through the transformation layers (e.g., convolution layer 203Q, pooling layer 204Q, and multi-layers 205Q). In some examples, real-valued vector $f_q$ may be stored in a floating point representation, e.g., as an array of 64-bit (double precision) or 32-bit (single precision) IEEE 754 floating point values, or any other suitable representation.

Convolution layer 203Q maps input data to output data by convolving the input data with one or more convolutional kernels, so that the output data may indicate patterns (e.g., local spatial arrangement) in the input data. Each convolutional kernel includes a grid of weights of any suitable dimensionality (e.g., two dimensional) which may be hand-designed, randomly initialized, and/or learned along with other weights of the RBE model 200. The convolution operation includes repeatedly performing a matrix multiplication of a convolutional kernel by a portion of spatially adjacent inputs, at each of a plurality of spatial positions in the input layer, and summing the results based on the spatial position in the input layer. The output of the convolution operation is a layer of convolved features.

Each feature in the layer of convolved features may have a magnitude representing a spatial arrangement of input features, according to the convolutional kernel. Although convolution layers are suitable for a range of different tasks including generating semantic embeddings, it is instructive to explain convolution layers in the context of an exemplary image processing task, e.g., detecting an object within a two-dimensional image. For example, convolution of image input features with a two-dimensional convolutional kernel may be used to distinguish primitive shapes in the image input features, e.g., convolving with a convolutional kernel having large positive values arranged in an "L" shape and negative values elsewhere may result in a large positive value at points corresponding to locations in the input which had "L" shaped features. In an example where the input features are a one-dimensional grid of text (e.g., search queries as described herein), a one-dimensional convolutional kernel may be able to identify features of spatial arrangement of words within a sentence (e.g., by using a convolutional kernel associated with a specific letter 3-gram to detect a spatial overlap of an occurrence of the first letter 3-gram with a different letter 3-gram). The output of a convolution layer need not be of the same dimensionality as the input layer, but may be of a different dimensionality as the input layer according to the dimensionality of the convolutional kernel and the number of convolutional kernels used (e.g., where using additional convolutional kernels may increase a dimensionality of the layer of convolved features). Accordingly any suitable dimensionality and number of convolutional kernel(s) may be used, in order to map the input layer to a layer of convolved features of a desired dimensionality, before further processing by pooling and multi-layers.

The pooling layer 204Q may be based on any suitable pooling function (e.g., max pooling) and may effectively select a salient portion and/or feature of the output from the convolution layer 203Q. In an example where multiple different convolutional kernels are used, pooling layer 204Q may select, at positions corresponding to each spatial position of the input, a portion of the convolved outputs that was generated by a particular one of the convolutional kernels. For example, a max pooling layer may select a portion of the convolved outputs that has a highest magnitude as compared to portions generated by different convolutional kernels. Accordingly, the selected portion may represent a salient spatial feature corresponding to the convolutional kernel.

As with convolution layers, max pooling may be easiest to understand in the context of image processing. In the above example of detecting an "L" shape in a two-dimensional image, if the convolved feature corresponding to the "L" shape has a higher magnitude than convolved features generated by different convolutional kernels (e.g., having a "T" shape), then a max pooling layer may effectively select the "L" shape as a most salient shape occurring in the image. Similarly, in the example of one-dimensional textual data, the max pooling layer may select a most salient phrase based on a local structure of the phrase (e.g., a phrase that recurs in the input, or a pattern of words that is repeated with minor variations). In other examples, a max pooling layer may select a single position in the convolved output having a highest magnitude generated out of all of the convolutional kernels. Illustrating this use of max pooling in the context of image processing, in the example of detecting an "L" shape, the max pooling layer may select a single position where an "L" was detected. Similarly, in the example of one-dimensional textual data, the max pooling layer may select a most salient position in the whole output, e.g., corresponding to detecting a grammatical subject of a sentence. As with the convolution layer, the pooling layer may generate pooled features of the same dimensionality as the inputs, or of any other suitable dimensionality. For example, a max pooling layer could generate pooled features of a higher dimensionality by selecting more than one result (ranked by magnitude of convolved features), instead of selecting only a single highest-magnitude result.

The multi-layers 205Q may include one or more layers that further transform the pooled features output by the pooling layer 204Q. For example, each layer of the multi-layers 205Q may include a plurality of neuron units, where each neuron unit receives a weighted sum of outputs from a previous layer, and outputs a non-linear transformation of the weighted sum. Each multi-layer may be implemented as a weight matrix, and the operation of a layer may be implemented as a matrix multiplication operation in conjunction with a non-linear, elementwise activation function (e.g., elementwise application of tan h). Matrix representations of multi-layers 205Q may be dense (e.g., stored in a contiguous array) or sparse (e.g., by storing zeroes of the matrix implicitly in a run-length encoding). As with the convolution layer 203Q and pooling layer 204Q, the multi-layers 205Q may transform pooled features into transformed features of any suitable dimensionality. For example, it may be suitable to transform features to a higher dimensionality in some multi-layers (e.g., to learn a sparse encoding of the features). In other examples, it may be suitable to transform features to a lower dimensionality in some multi-layers (e.g., to classify features among a small number of possible output classes). A single neural network may alternate between layers which increase and/or decrease dimensionality. Furthermore, a neural network may facilitate optimization of the network behavior by training via gradient descent, as the gradient of the objective function may be computed with regard to the neural network weights via backpropagation (e.g., via repeated applications of the "chain rule" for derivatives).

The query neural network 201Q may be able to express a rich variety of mathematical functions to transform inputs received at query input layer 202Q to a real-valued semantic embedding $f_q$ output by the multi-layers 205Q. When the query neural network is a deep semantic model (e.g., a CLSM network, DSSM network, and/or CDSSM network), it may have the beneficial properties of being discriminative and order-sensitive. The semantic embedding output by the multi-layers 205Q is further processed by the RBE layers 206Q, as will be described below. The query neural network 201Q and candidate answer neural network 201K may have substantially similar architecture, as depicted, although the two networks may have distinct sets of parameters (e.g., the values u and v, as well as parameters defining convolutional kernels of the convolution layers 203Q and 203K, and/or weights of the multi-layers 203Q and 203K). Accordingly, in the example shown in FIG. 2A, the answer neural network 201K is depicted with substantially similar components as query neural network 201Q, except with subscripts changed from "q" to "k" to indicate that answer neural network 201K may have different parameters than query neural network 201Q. In other embodiments, the query neural network 201Q and the candidate answer neural network 201K may have different architectures.

Figure 2C:
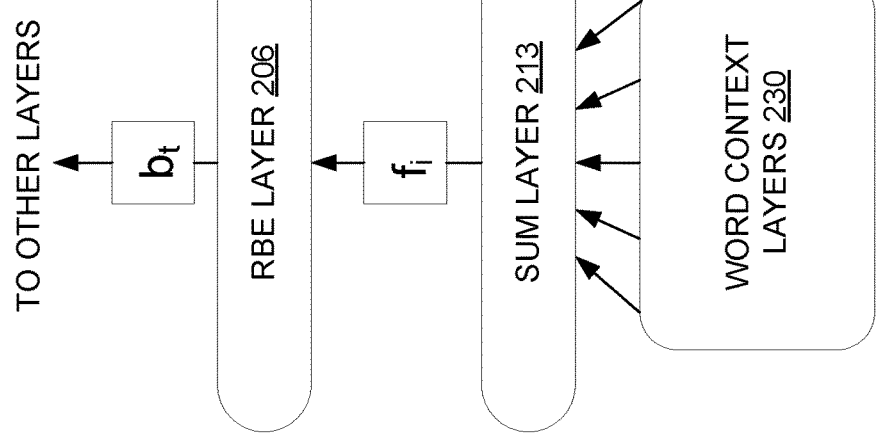
FIGS. 2B-2C show two alternative model architectures for a recurrent binary embedding system.
Figure 2B:
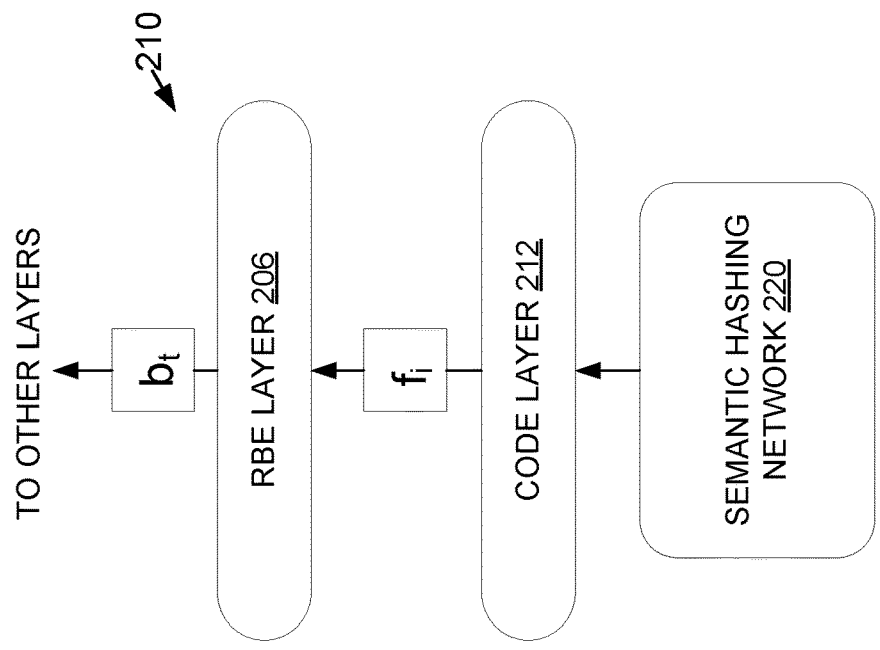

RBE may be used to extend any suitable neural network model in order to transform real-valued vectors output by output and/or hidden layers of the network model into binarized RBE embedding vectors. In the foregoing example, the neural network model may be a CLSM network, a DSSM network, and/or a CDSSM network; however, RBE may alternately or additionally be used in conjunction with any other suitable neural network model(s). For example, FIG. 2B-2C depict two alternate exemplary RBE systems. FIG. 2B depicts a semantic hashing RBE system 210 that processes the code layer 212 output of a semantic hashing network 220 at an RBE layer 206. FIG. 2C depicts a word embedding RBE system 211 that processes, at RBE layer 206, summed output 213 of a plurality of word context layers 230 (e.g., word context layers output by a word embedding model such as word2vec, GloVe, a continuous bag-of-words (CBOW) model, or any other suitable word and/or phrase embedding model). In each case, the networks include RBE layers 206 mapping from $f_i$ to $b_i^t$. For example, RBE layers 206 may comprise a query RBE layer 206Q and an answer RBE layer 206K as shown in FIG. 2A. Outputs $b_i^t$ of the RBE layers 206 may be used as inputs for any suitable further processing, e.g., further neural network layers.

Returning to FIG. 2A, the RBE layers 206Q recurrently process the real-valued embedding $f_q$ to transform the real-valued embedding into a refined binary embedding (RBE) vector, $b_q^u$, which may represent the same semantic embedding as $f_q$ while requiring substantially less memory space to store than real-valued embedding $f_q$. The RBE layers 206Q are formulated by the following equations:

$$b_i^0 = \rho(W_i f_i) \qquad \text{(EQUATION 1)}$$

$$f_i^{t-1} = \tan h(B_i^{t-1} \cdot b_i^{t-1}) \qquad \text{(EQUATION 2)}$$

$$d_i^{t-1} = \rho(R_i^{t-1} \cdot (f_i - f_i^{t-1})) \qquad \text{(EQUATION 3)}$$

$$b_i^t = b_i^{t-1} + \left(\frac{1}{2}\right)^t d_i^{t-1},$$ (EQUATION 4)

where $f_i \in \mathbb{R}^m$, $t \geq 1$ is a time axis representing a number of iterations to recurrently process the encoding, and $b_i^{t-1} \in \{-1, 1\}^n$ (e.g., a string of length n including the values −1 and 1). Although not shown in EQUATIONS 1-4, the RBE layers 206Q may be defined to add bias terms to one or more of the vectors defined in EQUATIONS 1-4, e.g., $b_i^0$ may include an additional bias summand $s_i^0$ so that $b_i^0 = \rho(W_i \cdot f_i + s_i^0)$. Bias terms may be added to EQUATIONS 1-4 to represent any suitable bias values, e.g., constant bias values, random bias values, and/or learned bias values that are at least partially determined by a neural network parameter learned while training the RBE model. A binary embedding $b_i^{t-1}$ may be efficiently stored in a packed format by representing the value −1 as 0 and the value 1 as 1, respectively, and storing the resulting binary string of 1s and 0s in a native binary storage format. The key idea behind the above equations is to construct the binary decomposition $b_i^t$ by maximizing the information extracted from the real-valued vectors $f_i$. A number of intermediate vectors are involved during the training process to achieve this objective: 1) the base vector $b_i^0$; 2) the reconstructed vector $f_i^{t-1}$; 3) the residual vector $d_i^{t-1}$; and 4) the refined vector $b_i^t$.

(EQUATION 1) defines the base vector $b_i^0$ as a transformation of the real-valued embedding vector $f_i$ (in float) by an n×m matrix $W_i$, where the index i is either q or k (according to whether the transformation is being performed in the query neural network 201Q or the candidate answer neural network 201K, respectively). The result of this transformation is then mapped into a binary base vector, vector $b_i^0$ through elementwise application of the binarization function ρ. The binarization function ρ in (EQUATION 1) and (EQUATION 3) plays an important role in training the RBE model 200. In the forward computation, ρ converts float input x into a binary value of either −1 or +1 as the following:

$$\rho(x) \equiv sign(x) = \begin{cases} -1 & \text{if } x \leq 0 \\ 1 & \text{otherwise} \end{cases}.$$ (EQUATION 5)

However, the binarization function as defined above may be unsuitable for computing the gradient of the objective function with regard to the weights via backpropagation, since the gradient of the sign function vanishes almost everywhere. Accordingly, different gradient estimators may be used to mimic the sign function during the forward computation, while having a gradient more suitable for the backward computation.

The straight-through estimator takes the gradient of the identity function as the estimate of the derivative of ρ with respect to x, $\rho'(x)$. A variant of this estimator, the straight-through variant estimator, sets $\rho'(x)=1$ when $|x| \leq 1$ and $\rho'(x)=0$ otherwise. The straight-through variant estimator is believed to have better convergence properties, as compared to the straight-through estimator.

Another estimator, the annealing tan h estimator, mimics the discontinuous sign function with an annealing hyperbolic tangent (tan h) function in the backward computation. The annealing tan h function approaches a step function when the annealing slope α increases:

$$\lim_{\alpha \to \infty} \tanh(\alpha x) = sign(x).$$ (EQUATION 6)

The slope is initialized with α=1, and is increased gently, which may ensure convergence.

In other embodiments, an unbiased gradient estimator (e.g., based on a logistic sigmoid function) may be used.

The following example illustrates a benefit of binary decomposition. If:

$$b_q^1 = b_q^0 + d_q^0, b_k^1 = b_k^0 + d_k^0$$ (EQUATION 7)

where $b_q^0$, $d_q^0$, $b_j^0$, $d_k^0$ are binary vectors, then the cosine similarity may be defined as follows:

$$\cos(b_q^1, b_k^1) = \frac{b_q^1 \cdot b_k^1}{\|b_q^1\| \|b_k^1\|} = \frac{(b_q^0 \cdot b_k^0 + b_q^0 \cdot d_k^0 + d_q^0 \cdot b_k^0 + d_q^0 \cdot d_k^0)}{\|b_q^1\| \|b_k^1\|}.$$ (EQUATION 8)

The binary decomposition allows implementing the cosine similarity computation via a series of dot products of binary vectors, which can be implemented efficiently on modern hardware, including GPUs. The hardware-enabled computation, together with the compact representation as binary vectors, enable billion-scale IR systems to be implemented using a practical number of consumer-grade GPUs.

Returning to FIG. 2A and (EQUATIONS 1-4), (EQUATION 2) defines the reconstructed vector $f_i^{t-1}$; by converting the n dimensional binary vector $b_i^{t-1}$ back to an m dimensional vector in float. The transformation is through an m×n matrix $B_i^{t-1}$, followed by an element-wise tan h.

(EQUATION 3) defines the binary residual vector $d_i^{t-1}$ by transforming the difference between $f_i$ and $f_i^{t-1}$ by an n×m matrix $R_i^{t-1}$, followed by an element-wise ρ. The transformed binary vector $d_i^{t-1}$ is called the residual vector because it is transformed from the residual between the original embedding vector and the reconstructed vector.

(EQUATION 4) defines a binary refined vector $b_i^t$, by recursively adding residual vectors from the previous time stamps t, multiplied by a residual weight $(\frac{1}{2})^t = 2^{-t}$. The residual weight is determined according to the timestamp, with residual weights at successive timestamps representing successive improvements to granularity values that may be expressed by the refined vectors. The last refined vector (e.g., at a final time stamp t) is the RBE embedding. The binary vectors adding up to form the RBE embedding are the ingredient vectors. The base of the weighting schema when summing residual vectors to make a refined vector in (EQUATION 4) is set to ½. A weighting schema of ½ may be suitable due to equal distance values for each dimension. Furthermore, the weighting schema of ½ may facilitate a hardware enabled implementation with a bit-wise operation.

The presence of the residual weights in (EQUATION 4) may increase richness of the RBE representation (e.g., with regard to the ability to encode and discriminate between a large cardinality of different semantic embeddings). Each dimension of a binary vector in (EQUATION 4) takes a value of either −1 or 1. When two binary vectors are added without the residual weight as in (EQUATION 7), each dimension will have a value in {−2, 0, 2}. In contrast, if two vectors, each including a base vector from timestamp 0 and a single residual vector from timestamp 0 are added to generate a refined vector at timestamp 1, the set of possible values becomes $\{-1.5, -0.5, 0.5, 1.5\}$ (e.g., the refined vector at timestamp 1 may be calculated as $$b_i^1 = b_i^0 + \left(\frac{1}{2}\right)^1 d_i^0,$$

where $d_i^0$ is a binary vector including the values $-1$ and/or 1 and, accordingly $$\left(\frac{1}{2}\right)^1 d_i^0$$

is a vector including the values $-0.5$ and/or $0.5$). As a result, the cardinality of all RBE embeddings with two ingredient vectors increases from $3^n$ to $4^n$. In general, for RBE embeddings with $j=t+1$ ingredient vectors, the cardinality grows $(2^j/(j+1))^n$ times (e.g., relative to a base vector alone) by introducing residual weights. This may enable a huge boost in accuracy.

As a further example of a hardware enabled computation facilitated by an RBE embedding representation, the following proportion (EQUATION 9) can be derived:

$$\cos(b_q^u, b_k^v) \propto \frac{1}{\|b_k^v\|}\left(b_q^0 \cdot b_k^0 + \sum_{j=0}^{u-1}\sum_{i=0}^{v-1}\left(\frac{1}{2}\right)^{j+i+2} d_q^j \cdot d_k^i + \sum_{j=0}^{u-1}\left(\frac{1}{2}\right)^{j+1} b_q^0 \cdot d_k^j + \sum_{i=0}^{v-1}\left(\frac{1}{2}\right)^{i+1} b_k^0 \cdot d_q^i\right) \quad \text{(EQUATION 9)}$$

A value proportional to cosine similarity, as computed in (EQUATION 9) may be a suitable proxy for an actual cosine similarity value (e.g., because the value is proportional to actual cosine similarity values with the same proportionality for all pairs of RBE embeddings that may be compared). In the above proportion, the magnitude of the query RBE embedding is omitted because the magnitude of the query RBE embedding is the same regardless of the candidate answers. (EQUATION 9) decomposes the dot product of RBE embeddings into dot products of binary vectors, which can be implemented with bit-wise operations as the following:

$$x \cdot y = (popc(x \wedge y) >> 1) + n \quad \text{(EQUATION 10)}$$

In (EQUATION 10), x and y are vectors in $\{-1, 1\}^n$. On the right side of (EQUATION 10), "popc", "$\wedge$", and ">>" are the population count (e.g., number of 1 entries in the vector), XOR, and logical right shift operators, respectively. Multiplying the residual weights also uses the right shift operator, which is executed at most u+v times by carefully ordering the results of binary dot products. The right shift operator incurs an extremely low latency and power consumption (e.g., relative to arithmetic multiplication or floating point operators). For example, computing $\frac{1}{2}a+\frac{1}{4}b$ costs 3 shifts when calculated as $(a>>1)+(b>>2)$, but only costs 2 shifts when calculated as $(a+(b>>1))>>1$. Since the candidate answer RBE embedding magnitude $\|b_k^v\|$ is usually precomputed and stored with the RBE embeddings, the computation of cosine similarity boils down to a series of binary operations that can be accelerated with (EQUATION 10), which enables an IR system based on exhaustive k-NN matching.

A looped pattern is exhibited in the equations of (EQUATION 2), (EQUATION 3), and (EQUATION 4). The pattern may also be seen in FIG. 2A, where $B_i^{t-1}$, $R_i^{t-1}$ alternate to generate the reconstructed vector and the residual vector, and to refine the base vector iteratively. The word "recurrent" in RBE refers only to the looped pattern, and does not necessarily imply a similarity to other network structures such as RNN and LSTM. For example, for RNN- and LSTM-like models, recurrent transformations typically share the same set of parameters from t−1 to t. In contrast, RBE has the flexibility to use parameters of $B_i^{t-1}$, $R_i^{t-1}$, which may be either time varying or fixed. This may help to optimize the system under various design constraints.

Furthermore, RBE may be implemented with two different time axes, u and v, for the query neural network 201Q and the candidate answer neural network 201K, respectively. These values may be used in place of the respective t values in (EQUATION 2), (EQUATION 3), and (EQUATION 4) (e.g., substituting u for t when calculating in the query neural network 201Q, and respectively substituting v for t when calculating in the candidate answer neural network 201K). The two time axes u and v are independent, so the query neural network 201Q and candidate answer neural network 201K may each perform a different number of iterations to produce RBE embeddings. The two time axes may give RBE additional flexibility to meet design constraints.

In general, increasing u and v in (EQUATION 9) may improve accuracy, but may increase a cost in terms of memory requirements and running time. A key observation is that the memory impact of u is relatively negligible. An asymmetric design with u>v is feasible thanks to the independent time axes (e.g., the query neural network may be configured to transform a real-valued vector into a greater number, u, of binary ingredient vectors as compared to the v binary ingredient vectors generated by the candidate answer neural network). However, while adding more ingredient vectors on the query side may improve accuracy without increasing a cost in memory requirements, doing so may also increase running time of processing a query.

At the top of FIG. 2A, RBE embeddings from both sides (e.g., $B_q^u$ and $B_k^v$) may be used to evaluate an objective function 207 based on a training label 208. Accordingly, a trained RBE model 200 may be learned from a training set including query/answer pairs (e.g., determined by user selection of candidate answers among search results). The learned model is applied to generate query and candidate answer embedding vectors for retrieval. For training, a positive sample is constructed from a query/answer pair (e.g., resulting from user selection of a candidate answer), and label 208 indicates that the sample is a positive sample. Negative samples may be derived from positive samples through cross sampling (given two pairs of positive samples $<q_1, k_1>$ and $<q_2, k_2>$, cross sampling produces two negative samples $<q_1, k_2>$ and $<q_2, k_1>$); accordingly label 208 indicates that the sample is a negative sample. For each sample, the query neural network and candidate answer neural network produce a pair of vectors as in FIG. 2A, where $f_q$ and $f_k$ are for the query and a candidate answer, respectively. A sample group S, which includes one positive sample and a fixed amount of negative samples, is the basic unit to evaluate the objective function:

$$O(S;\Theta) = -\Sigma_{S \in G} \log P(S), \quad \text{(EQUATION 11)}$$

where G is the set of all sample groups, and $\Theta$ is the set of all parameters of the RBE model 200, e.g., convolutional kernels, multi-layer weights, and RBE parameters $B_i^t$, $R_i^t$, $W_i$ for i∈{q, r} (for the query neural network 201Q and candidate answer neural network 201K, respectively). In the above equation:

$$P(S) \equiv P(s^+ \mid S) = \frac{\exp(\gamma\beta(f_q(s^+), f_k(s^+)))}{\sum_{s \in S} \exp(\gamma\beta(f_q(s), f_k(s)))}, \quad \text{(EQUATION 12)}$$

where $P(s^+|S)$ is the probability of the only positive query/answer pair in the sample group, given S. The probability $P(s^+|S)$ is computed in a manner similar to the "softmax" function for turning an arbitrary distribution of real numbers into a probability distribution. The smoothing factor γ determines an associated variance, e.g., determining how dramatically a change in the similarity function $\beta(f_q, f_k)$ affects a change in the resulting probability $P(s^+|S)$. The smoothing factory is set empirically (e.g., by cross-validation) on a held-out data set. The similarity function is defined as the following:

$$\beta(f_q, f_k) \equiv \cos(f_q, f_k) = \frac{f_q \cdot f_k}{\|f_q\|\|f_k\|} \quad \text{(EQUATION 13)}$$

Unlike real-valued $f_q$ and $f_k$, $b_q^u$ and $b_k^v$ can be decomposed into a series of u+1 and v+1 binary vectors. Accordingly, the similarity function in (EQUATION 12) and (EQUATION 13) may be replaced by:

$$\beta(b_q^u, b_k^v) \equiv \cos(b_q^u, b_k^v) \quad \text{(EQUATION 14)}$$

With RBE embedding, it is believed that storing one billion candidate answers may require over an order of magnitude less storage as compared to a real-valued embedding (e.g., only about 14.90 GB, instead of about 238 GB of memory). This may make in-memory retrieval from among a large number of candidate answers possible on a small number of consumer-grade GPUs. For example, the similarity function may be computed exhaustively for all query/answer pairs with a k-NN selection algorithm, which may reduce an occurrence of false negatives to almost zero. Also, because of exhaustive matching, there may be no need to make implicit or explicit assumptions about data distributions (e.g., compared to ANN approaches), which may result in consistent retrieval speed and accuracy. RBE may learn application specific representations (e.g., by training end-to-end with feedback from the application via gradient descent, according to the backpropagation algorithm for neural networks, or via any other suitable optimization method), and accordingly may be more accurate than general-purpose quantization algorithms. Similarly, RBE may be more accurate than other learning-based binarization algorithms because of the recurrent structure. In addition, an IR system based on RBE mostly uses primitive integer operations available on consumer-grade GPUs. As a result, RBE implemented on low-end GPUs may outperform other approaches implemented on more capable GPUs. It is also believed that RBE may be easily ported to different hardware platforms.

An RBE model 200 with specially constructed embedding vectors $b_u^q$ and $b_v^k$ may be trained according to labelled input examples such that the objective function defined in (EQUATION 11) is minimized:

$$\arg\min_{\Theta} O(G; \Theta). \quad \text{(EQUATION 15)}$$

For example, the objective function may be minimized by stochastic gradient descent on the weights Θ, wherein a gradient of the objective function with regard to the weights is determined by backpropagation. Alternately or additionally, the objective function may be minimized using batch gradient descent, conjugate gradient methods or any other suitable optimization technique.

FIG. 4A shows a non-limiting example of a training procedure for implementing an RBE model in BrainScript™, a high-level programming language for neural networks included in Microsoft Cognitive Toolkit™, a freely-available, open-source machine learning software toolkit. Alternately or additionally, RBE models may be trained and implemented using any suitable programming language(s), framework(s), and/or software libraries. Furthermore, although FIG. 4A shows a particular exemplary architecture of an RBE model (e.g., defined by particular values such as a dimensionality of the binary embeddings, a number of timestamps for the query and answer side of the model, use of CLSM networks for generating real-valued embeddings, etc.), RBE models may be implemented using any suitable architecture (e.g., by varying values such as dimensionality of binary embeddings and number of timesteps, using different neural network and/or artificial intelligence models for generating real-valued embeddings, etc.). Furthermore, training of RBE models is not limited to the procedure shown in FIG. 4A, and RBE models may be trained using any suitable training procedure, e.g., using supervised learning.

FIG. 4A shows an unfolded RBE model, in which the recurrent embedding is expanded into a series of feed-forward neural network layers, e.g., expanding the recurrence shown in RBE layers 206Q of FIG. 2A into u different feed-forward values. Lines 4001-4005 define a feed-forward layer using the "straight-through variant" function described above. Parameters m and n represent the dimensions of the output and input nodes respectively.

The RBEUnit macro at lines 4007-4012 implements RBE layers (e.g., RBE layers 206Q). The input InNode shown at line 4008 is an intermediate RBE embedding vector. The input EmbeddingNode is a real-valued vector $f_i$, e.g., from multi-layers 205Q. numHiddenNodes is a dimensionality of a real-valued embedding used to generate the RBE embedding, and numBits is a dimensionality of the RBE embedding. Accordingly, at 4017 and 4018, the query and answer embeddings are initialized, e.g., based on output of multi-layers 205Q. In some examples, the real-valued embeddings at 4017 and 4018 may be outputs of a CLSM, DSSM, and/or CDSSM max pooling layer. As a non-limiting example, the Microsoft Cognitive Toolkit™ tutorial includes an exemplary CDSSM implementation suitable for initializing the real-valued embeddings at 4017 and 4018. At lines 4020-4023, the query side binary base vector is mapped from query embedding qemb through the feed-forward layer defined at lines 4001-4005. At lines 4021-4022, two residual vectors are recursively added to the base vector via the RBE unit defined at lines 4007-4012. The constant value CONST_HALF indicates a residual weight of 0.5 for the first residual vector, and the constant value CONST_QUARTER indicates a residual weight of 0.25 for the second residual vector. A similar procedure is applied, at lines 4024-4025, to the answer side embedding, although only a single residual vector is added to the base vector.

Although FIG. 4A shows a training procedure for two residual vectors (e.g., u=2) on the query side and one residual vector (e.g., v=1) on the answer side, similar CNTK code may be configured to implement a training procedure for any suitable number of residual vectors, e.g., by adding additional lines similar to lines 4021-4022 with appropriate constant values indicating the residual weight for each successive residual vector, and with each successive residual vector depending on a previous residual vector as with vectors qb2 and qb1. Lines 4028-4031 implement a simple training procedure based on an exemplary CNTK implementation of a CDSSM objective function (e.g., as described in the Microsoft Cognitive Toolkit™ tutorial). Alternately or additionally, any other suitable training procedure for CDSSM and/or feed-forward neural networks may be applied, e.g., by adapting lines 4028-4031 to implement different objective functions.

Returning to FIG. 1, the trained RBE model 200 may be suitable for use in method 100, to transform candidate answers to a plurality of candidate answer RBE embeddings, as at 101. An rbeGIR system may use multiple GPUs to store and process the RBE embeddings. At 102, method 100 further includes uploading the candidate answer RBE embeddings to one or more GPU devices. For instance, the candidate answer RBE embeddings may be stored in memory associated with a CPU executing an RBE implementation. The CPU may partition the candidate answer RBE embeddings to divide them into subsets that are small enough to divide across the GPUs. The candidate answer RBE embeddings may be transferred to the one or more GPUs in a bulk, streaming fashion, which may increase a throughput of the upload, and accordingly reduce a latency to transfer all of the candidate answer RBE embeddings.

Figure 3A:
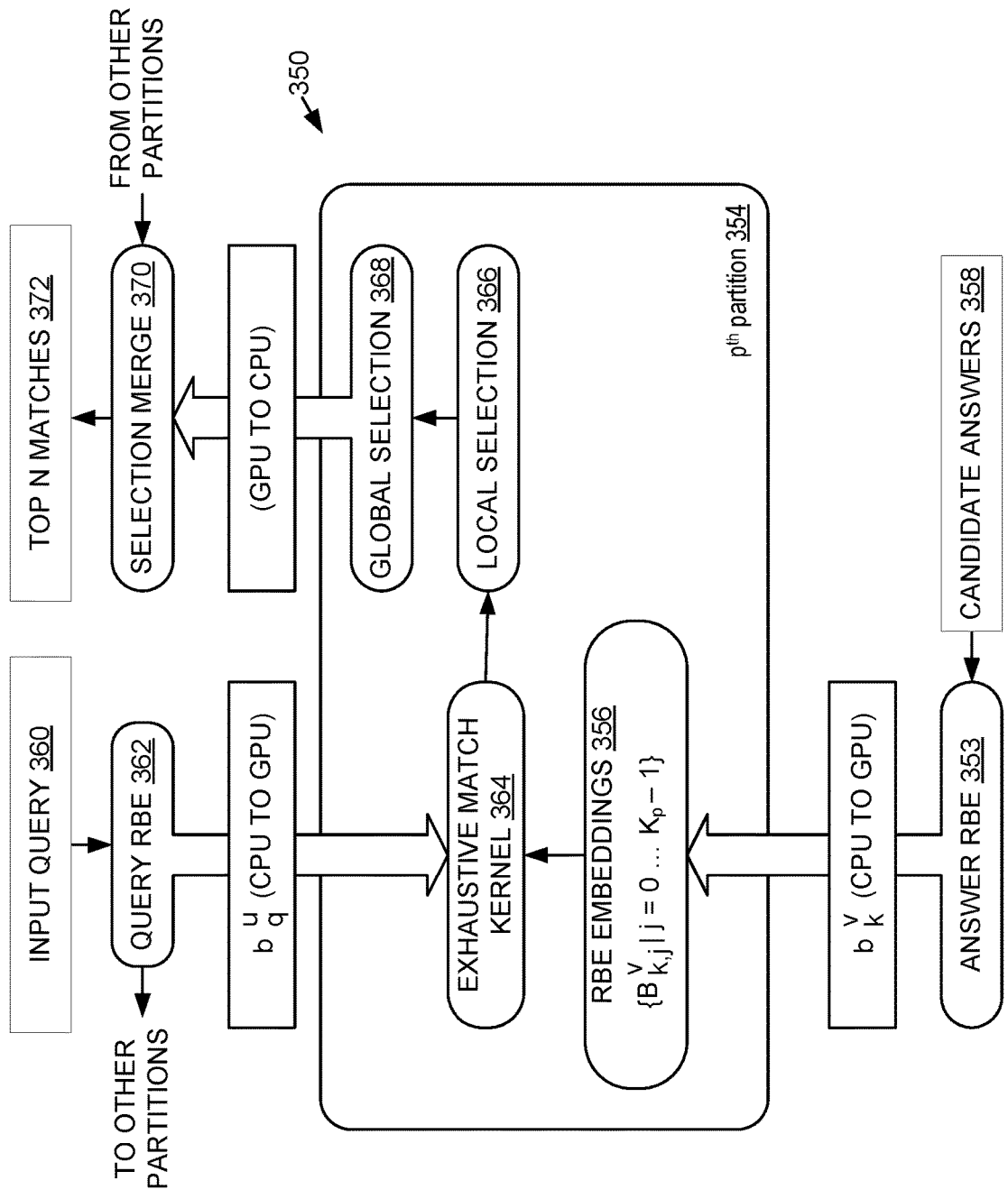
FIG. 3A depicts dataflow between a CPU and a GPU in an exemplary GPU-enabled information retrieval system.

FIG. 3A depicts a high-level architecture of an rbeGIR system 350. FIG. 3A depicts dataflow between a $p^{th}$ GPU and the CPU, including the transfer of a candidate answer RBE embedding 352 represented as $b_k^v$ from the CPU to the GPU. The $p^{th}$ partition 354 in the middle of FIG. 3A represents the key components of the $p^{th}$ GPU, where the corresponding data partition stores RBE embeddings 356 represented by $\{B_{k,j}^v | j=0 \ldots K_p-1\}$. The raw candidate answers 358, $K_p$ in total for the $p^{th}$ partition, are transformed offline (e.g., at a separate time prior to processing a query with the RBE model 200) to vectors through the candidate answer neural network 201K of the model (e.g., as depicted in FIG. 2A). As depicted in FIG. 3A, candidate answer RBE embeddings 356 are uploaded to GPU memory from CPU memory. The raw candidate answers 358 may alternately be transformed online while processing the query and/or offline, by one or more CPUs and/or GPUs. After uploading the candidate RBE embeddings 356, the candidate RBE embeddings 356 are collectively stored by the one or more GPUs (e.g., divided across the partitions). In some examples, rbeGIR system 350 includes an offline answer embedding machine configured to transform the raw candidate answers into RBE embeddings as described herein (e.g., prior to processing a query with the RBE model, or at any other suitable time during the information retrieval process).

FIG. 3B depicts an exemplary computing environment 300 suitable for implementing an RBE system according to the present disclosure. Computing environment 300 includes a search engine platform computer 301 communicatively coupled via a computer network 310 to a content curator computer 330, and one or more user computers (e.g., user computer 321 and user computer 322). Network 310 may be any suitable computer network (e.g., the Internet). Search engine platform computer 301 includes a CPU 302 and one or more GPUs, e.g., GPU 303 and GPU 304. Search engine platform computer 301 may be implemented with a small number of consumer-grade GPUs. For example, a computing device suitable to implement search engine platform computer 301 of FIG. 3B may include four NVIDIA GEFORCE GTX™ GPUs, two 8-core CPUs, and 128 GB of DDR memory.

Returning to FIG. 1, at 103, method 100 further includes transforming a raw input query 360 to a query RBE embedding 362. The query may be processed using the query neural network 201Q of the RBE model 200, to obtain the RBE embeddings.

At 104, method 100 further includes uploading the query RBE embedding 362 to each of the one or more GPUs. As shown in FIG. 3A, at run time based on raw input query 360, a query embedding $b_q^u$ is generated on-the-fly by the query neural network of the RBE model 200 and sent to the $p^{th}$ GPU. The same query embedding 362 is also sent to other partitions (e.g., other GPUs) as shown on the upper left side of FIG. 3A. Accordingly, each GPU looks for the same query vector, attempting to find a match (e.g., an exact match if one is present, or otherwise, a closest match according to the similarity measure, e.g. cosine similarity) among the subset of candidate answer vectors stored at that GPU.

At 105, method 100 includes finding the best candidate answer RBE embeddings at each GPU device. At 106 and as shown in FIG. 3A, finding the best candidate answer RBE embeddings at each GPU device includes executing an exhaustive match kernel 364 on each GPU. In some examples, an RbeGIR system (e.g., RbeGIR system 350) includes an exhaustive match machine configured to perform exhaustive matching as described herein, e.g., by executing the exhaustive match kernel 364 on each GPU in order to find the best candidate answer RBE embeddings.

FIG. 4B shows an algorithm listing defining an exemplary exhaustive match kernel for implementing an exhaustive k-NN selection algorithm designed for billion-scale retrieval. A kernel is a function replicated and launched by parallel threads on the GPU device, each with different input data. In FIG. 4B, I is the number of candidate answers to process per thread; $T_b$ is the number of threads per block (where a block is a logical unit containing a number of coordinated threads and a certain amount of shared resources); x is the block ID; y is the thread ID; and z is the memory offset to the candidate answer vectors. In this example, each kernel selects a candidate answer RBE embedding by memory offset z, which in turn is determined based on block ID x and thread ID y as shown at 401 (e.g., uniquely identifying each thread of a GPU, so that each kernel selects different candidate answer RBE embeddings). The input $b_k^v \in \Omega_y$ denotes the RBE embeddings of all candidate answers $\Omega_y$ processed by the $y^{th}$ thread.

At 402, the k-NN kernel clears (e.g., initializes) a priority queue used to store top similarity scores and indices found by the GPU thread executing the kernel. Although FIG. 4B and method 100 are described with reference to a priority queue, a k-NN kernel and selection merge process for RBE-based information retrieval may utilize any other suitable data structure (e.g., heaps, lists, trees, hash tables, Bloom filters) to aggregate and/or otherwise process results found by GPU threads executing a k-NN kernel.

At 403 through 407, the k-NN kernel loops over each possible index i in the range from 1 to I, e.g., each candidate answer to be processed by the GPU thread executing the k-NN kernel. For each such index I, at 404, the k-NN kernel computes a similarity value s via a cosine distance function of the query and candidate answer RBE embedding vectors (e.g., using an efficient binary arithmetic implementation of cosine distance as described herein). Alternately or additionally, the k-NN kernel may use any other suitable distance function for RBE embeddings, for example, based on an efficient binary arithmetic implementation of operations on RBE embedding vectors (e.g., dot product). At 405, the k-NN kernel inserts, into the priority queue, the similarity value s and the index z indicating the corresponding answer. At 406, the k-NN kernel adds the offset $T_b$ to the index z to select the next answer to be processed in the next iteration of the loop. Finally, after executing the loop I times, the k-NN kernel returns the priority queue for further processing on the GPU and/or CPU.

Returning to FIG. 1, method 100 includes, at 107, in each exhaustive match kernel, selecting a candidate answer RBE embedding from GPU memory of the GPU device. As shown in FIG. 3A, the selection algorithm starts from a local selection process 366 that relies on a k-NN kernel (e.g., as defined in FIG. 4B).

At 108, method 100 further includes, in each exhaustive match kernel, comparing the selected candidate answer RBE embedding to the query RBE embedding using a similarity function for RBE embeddings (e.g., the cosine similarity function as defined in (EQUATION 14), or an implementation based on (EQUATION 9)). The similarity function is evaluated for all pairs of $\langle b_q^u, b_k^v \rangle$. Accordingly, for each candidate answer RBE embedding of the plurality of candidate answer RBE embeddings, the candidate answer RBE embedding is compared to the query RBE embedding using a similarity function. The resulting similarity values are used to guide the per-thread local selection 366. The similarity values are also used for a GPU global selection process 368 to find the best candidate answers from the $p^{th}$ partition. As candidate answers are found, they are prioritized by similarity value in a priority queue.

At 109, method 100 further includes in each exhaustive match kernel (e.g., exhaustive match kernel 364 at the $p^{th}$ partition 354, as well as other exhaustive match kernels at other partitions), returning the priority queue of the best candidate answers to be sorted together with candidate answers returned by other kernels executing on the same GPU device.

At 110, method 100 further includes sorting the candidate answers computed by all of the kernels on each GPU device. Accordingly, the results in each priority queue may be combined so that the best results seen by all kernels may be collected. Sorting the results may be implemented using a GPU-based radix sort, which is believed to be one of the fastest sorting algorithms. In particular, radix sort algorithms may be able to determine a sorted position of a result in constant time. As such, if the number of available GPU threads is proportional to the number of results to be sorted, the entire sorting process may be performed in constant time. The priority queues used by k-NN kernels in the selection process may have any suitable length. It is believed that even when the priority queues have a length of 1 (e.g., tracking only 1 high-priority item in each kernel), the local and global selection processes may nonetheless have a negligible miss rate, e.g., the local and global selection processes will miss at most a small number of relevant answers, or may not miss any relevant answers. In particular, it is believed that when the number of relevant keywords is much smaller than the number of candidate keywords (e.g., 1000s of relevant keywords and millions or more candidate keywords), a probability of missing more than two relevant keywords may be extremely small (e.g., less than 0.03%).

The design of the exhaustive k-NN takes into consideration several key aspects of the GPU hardware to decrease running time of the algorithm. First, the global selection process 368 handles only the candidates in the priority lists. This may avoid extensive read and write operations in the global GPU memory, which may improve performance because global GPU memory may be substantially slower (e.g., typically 100 times slower or more) than shared GPU memory or thread-level registers. Second, a number of sequential kernels are fused into a single thread, which may take full advantage of thread level registers instead of much slower shared GPU memory and global GPU memory. The storage of RBE embeddings 356 is also re-arranged to utilize the warp-based memory loading pattern. Instead of organizing the embeddings based on the candidate answers 358, the base vectors and residual vectors are grouped and stored separately. In the case of RBE embeddings with two ingredient vectors, the base vectors are stored first in a continuous memory block, followed by the residual vectors. This makes it possible for a warp (32 consecutive threads) to load 128 bytes of memory in a single clock cycle, which may improve the kernel speed significantly.

As shown in FIG. 3A, the results from all GPUs will be used to produce the top N candidate answers 372 based on a global selection merge process 370. Accordingly, method 100 further includes, at 111, returning the best candidate answers from each GPU device. For example, each GPU device may provide a stream of the best answers to the CPU, where items in the stream are received by the CPU one-by-one, in descending order of quality. In some examples, an RbeGIR system (e.g., RbeGIR system 350) includes a global selection merge machine configured to perform the global selection merge process 370 to aggregate the top N candidate answers 372 based on the results from all GPUs.

At 112, method 100 further includes returning the top N candidate answers 372. For example, as the CPU receives a stream of the best answers from each GPU, the CPU may merge the streams into a combined stream by inserting items into the combined stream in descending order of quality, via selection merge process 370. Alternately or additionally, any other suitable method may be used to collect, sort, and merge the results from each GPU to obtain the top N candidate answers 372 at the CPU, for example, by collecting the best results from each GPU at a selected GPU of the GPUs, further sorting the results at the selected GPU with a GPU-based radix sort, and streaming the best N items from the selected GPU to the CPU. The number of candidate answers, N, may be any suitable number. For example, N may be determined by the search engine according to a number of search results to display on a single page, e.g., 50.

Returning briefly to FIG. 3B, search engine platform computer 301 may receive a query from a user computer (e.g., user computer 321) and process the query to return candidate answers according to method 100. After processing the query, search engine platform computer 301 may send search results back to user computer 321. Alternately or additionally, search engine platform computer 301 may send search results to content curator computer 330, and responsive to receiving the search results, content curator computer 330 may prepare additional content associated with the candidate answers (e.g., additional text, audio, and/or videos representing a relevant curated content item), and may send the additional content back to search engine platform computer 301 to be included in search results sent to user computer 321. User computer 321 may present the top results in a search result page or in any other suitable manner.

User computer 321 optionally may visually present a graphical user interface (GUI) allowing the user to provide feedback to search engine platform 301, the feedback indicating a relevance and/or quality of the search results (e.g., "good" or "bad"). Responsive to receiving such feedback, search engine platform computer 301 may improve the RBE model 200 (e.g., by constructing query/answer pairs labelled by the user feedback, and using the query/answer pairs in subsequent training).

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
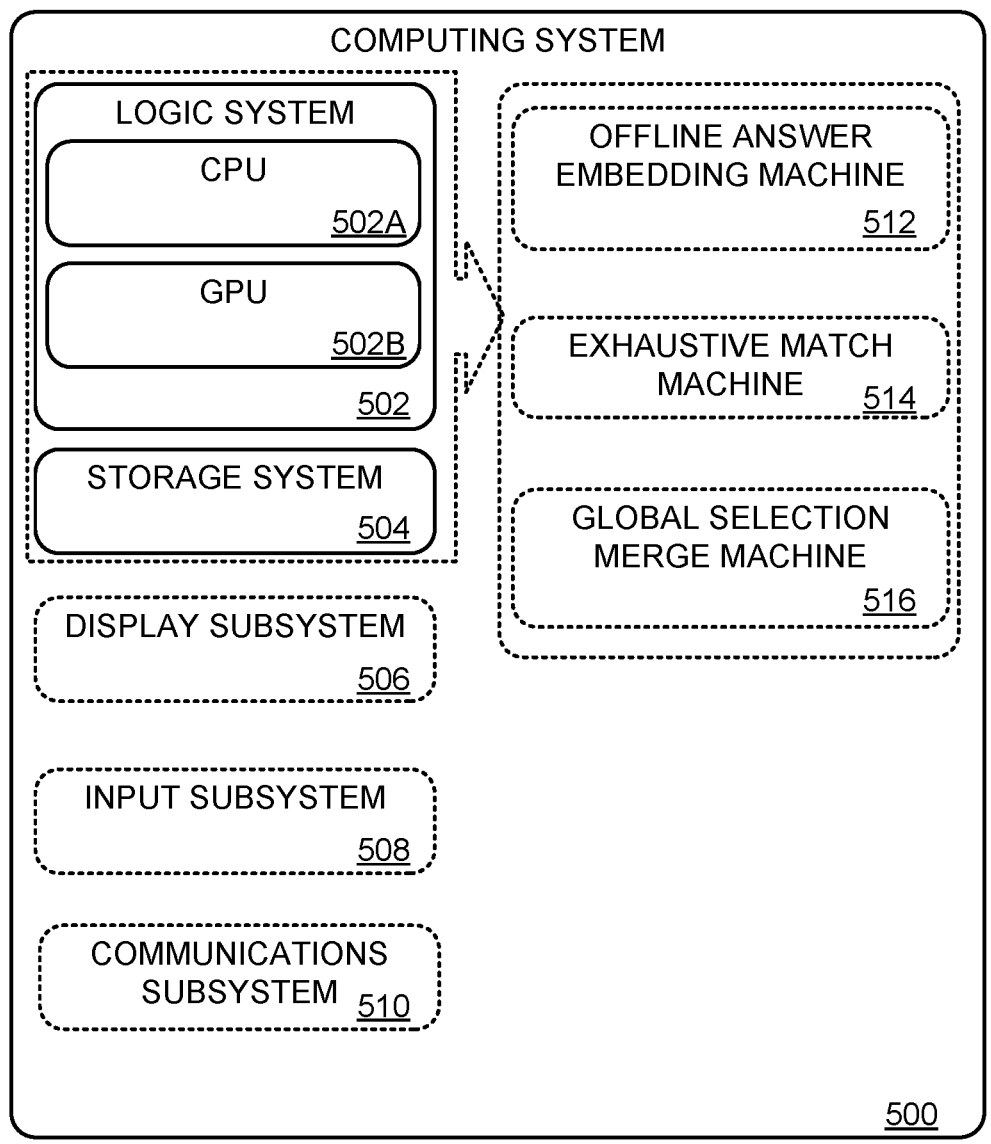
FIG. 5 shows an exemplary computing system.

FIG. 5 schematically shows a non-limiting embodiment of a computing system 500 that can enact one or more of the methods and processes described above. Computing system 500 is shown in simplified form. Computing system 500 may represent any computing device of a search engine platform, such as search engine platform computer 301 of FIG. 3B. Because the search methodology described herein may be performed on virtually any computer, computing system 500 alternatively may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

The logic subsystem may include one or more CPUs 502A in addition to one or more GPUs 502B, and the one or more CPUs may be configured to send executable instructions and/or data to the one or more GPUs. Responsive to processing of the instructions and/or data by the one or more GPUs, the CPU may receive result data from the one or more GPUs. In this manner, the logic subsystem may execute a large number of computations in parallel via the GPUs. In particular, the logic subsystem may efficiently perform method 100 of FIG. 1.

The present disclosure refers to a GPU as a computing device well-suited for RBE, because a GPU is configured to execute a very large number of multiple replicated instances of the same program (e.g., a GPU kernel) in parallel, where each instance of the program receives and works on different input data. However, it is to be understood that other aspects of a logic subsystem may be configured to provide the same or similar benefits. As one nonlimiting example, an application-specific integrated circuits (ASIC) may be specifically configured to store candidate answer RBE embeddings and find the best candidate answer RBE embeddings responsive to a search query. As such, it is to be understood that any discussion of GPUs also applies to other suitable computing components, and the present disclosure is in no way limited to performing method 100 or any other aspect of rbeGIR on GPUs to the exclusion of other suitable computing devices.

Storage subsystem 504 includes one or more physical devices configured to hold instructions executable by the logic subsystem to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 502 and storage subsystem 504 may be integrated together into one or more hardware-logic components. Such hardware-logic components may include GPUs, field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more machines, for example, offline answer embedding machine 512, exhaustive match machine 514, and/or global selection merge machine 516. As used herein, the term "machine" is used to collectively refer to hardware and any software, instructions, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines may be implemented via any suitable combination of state-of-the-art and/or future machine learning (ML) and/or artificial intelligence (AI) techniques, e.g., using any combination of ML and/or AI techniques described above.

The terms "module," "program," and "engine" may be used to describe an aspect of computing system 500 implemented to perform a particular function. In some cases, a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). For example, a GUI may be used to facilitate input of new search queries and/or to present search results. As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, game controller, or stylus. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition. Other example NUI componentry may include an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Virtually any input modality may be used to initiate a new search query.

When included, communication subsystem 510 may be configured to communicatively couple computing system 500 with one or more other computing devices (e.g., with one or more user computers as depicted in FIG. 3B). Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, an information retrieval system comprises: one or more graphical processing unit (GPU) devices; an offline answer embedding machine configured to: transform a plurality of candidate answers to candidate answer recurrent binary embedding (RBE) embeddings using a trained RBE model; and upload the plurality of candidate answer RBE embeddings to the one or more GPU devices; an exhaustive match machine configured to: transform a query to a query RBE embedding using the trained RBE model; upload the query RBE embedding to each GPU device of the one or more GPU devices; upload, to each GPU device of the one or more GPU devices, kernel instructions executable on each thread of a plurality of threads of the GPU device to operate an exhaustive match kernel configured to: select a candidate answer RBE embedding from GPU memory of the GPU device; compare the candidate answer RBE embedding to the query RBE embedding using a similarity function; populate a priority queue of candidate answers found on a thread of the GPU device; sort the candidate answers found on the GPU device based on the priority queue populated by each thread of the GPU device; and return the sorted candidate answers found on the GPU device; and a global selection merge machine configured to: merge the sorted candidate answers from each GPU device; and return a plurality of top candidate answers. In this example or any other example, the similarity function is a cosine similarity function implemented for RBE embeddings using binary arithmetic operations. In this example or any other example, the trained RBE model includes a query neural network and a candidate answer neural network. In this example or any other example, each of the query neural network and the candidate answer neural network includes one or more convolution layers, one or more pooling layers, and one or more feed-forward layers. In this example or any other example, each of the query neural network and the candidate answer neural network includes an RBE layer configured to transform a real-valued embedding vector into one or more binary ingredient vectors. In this example or any other example, the query neural network is configured to transform a real-valued embedding into a greater number of binary ingredient vectors compared to the candidate answer neural network.

In an example, a computational search method for retrieving computer information related to a query comprises: transforming a plurality of candidate answers to candidate answer recurrent binary embedding (RBE) embeddings using a trained RBE model; uploading the plurality of candidate answer RBE embeddings to one or more graphical processing unit (GPU) devices; transforming a query to a query RBE embedding using the trained RBE model; uploading the query RBE embedding to each GPU device of the one or more GPU devices; finding the best candidate answer RBE embeddings at each GPU device of the one or more GPU devices, wherein finding the best candidate answer RBE embeddings at a GPU device includes: executing an exhaustive match kernel on each thread of a plurality of threads of the GPU device, wherein executing the exhaustive match kernel on a thread of a GPU device includes: selecting a candidate answer RBE embedding from GPU memory of the GPU device; comparing the candidate answer RBE embedding to the query RBE embedding using a similarity function; and returning a priority queue of candidate answers found by the exhaustive match kernel; sorting the candidate answers found on the GPU device; and returning the candidate answers found on the GPU device;

merging the sorted candidate answers from each GPU device; and returning a plurality of top candidate answers. In this example or any other example, the similarity function is a cosine similarity function implemented for RBE embeddings using binary arithmetic operations. In this example or any other example, the trained RBE model includes a query neural network and a candidate answer neural network. In this example or any other example, each of the query neural network and the candidate answer neural network includes one or more convolution layers, one or more pooling layers, and one or more feed-forward layers. In this example or any other example, each of the query neural network and the candidate answer neural network includes an RBE layer configured to transform a real-valued embedding vector into one or more binary ingredient vectors. In this example or any other example, the query neural network is configured to transform a real-valued embedding into a greater number of binary ingredient vectors compared to the candidate answer neural network.

In an example, a computational search method for retrieving computer information related to a query comprises: transforming a plurality of candidate answers to candidate answer recurrent binary embedding (RBE) embeddings using a trained RBE model; transforming a query to a query RBE embedding using the trained RBE model; for each candidate answer RBE embedding of a plurality of candidate answer RBE embeddings, comparing the candidate answer RBE embedding to the query RBE embedding using a similarity function; sorting the candidate answers based on the comparisons using the similarity function; and returning a plurality of top candidate answers. In this example or any other example, the trained RBE model includes a query neural network and a candidate answer neural network. In this example or any other example, each of the query neural network and the candidate answer neural network includes one or more convolution layers, one or more pooling layers, and one or more feed-forward layers. In this example or any other example, each of the query neural network and the candidate answer neural network includes an RBE layer configured to transform a real-valued embedding vector into one or more binary ingredient vectors. In this example or any other example, the query neural network is configured to transform a real-valued embedding into a greater number of binary ingredient vectors compared to the candidate answer neural network. In this example or any other example, the computational search method further comprises uploading the plurality of candidate answer RBE embeddings to one or more graphical processing unit (GPU) devices; uploading the query RBE embedding to each GPU device of the one or more GPU devices; finding one or more best candidate answer RBE embeddings at each GPU device of the one or more GPU devices; and sorting and merging the one or more best candidate answers from each GPU device. In this example or any other example, finding the one or more best candidate answer RBE embeddings at a GPU device of the one or more GPU devices includes: executing an exhaustive match kernel on each thread of a plurality of threads of the GPU device; sorting the candidate answers found on the GPU device; and returning the one or more best candidate answers found on the GPU device. In this example or any other example, executing the exhaustive match kernel on a thread of the plurality of threads of the GPU device includes: selecting a candidate answer RBE embedding from GPU memory of the GPU device; comparing the candidate answer RBE embedding to the query RBE embedding using a similarity function; and returning a priority queue of candidate answers found by the exhaustive match kernel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An information retrieval system comprising:
   one or more graphical processing unit (GPU) devices;
   an offline answer embedding machine configured to:
      transform a plurality of candidate answers to candidate answer recurrent binary embedding (RBE) embeddings using a trained RBE model configured to transform a real-valued embedding into an RBE embedding including a plurality of binary ingredient vectors; and
      upload the plurality of candidate answer RBE embeddings to the one or more GPU devices;
   an exhaustive match machine configured to:
      transform a query to a query RBE embedding using the trained RBE model;
      upload the query RBE embedding to each GPU device of the one or more GPU devices;
      upload, to each GPU device of the one or more GPU devices, kernel instructions executable on each thread of a plurality of threads of the GPU device to operate an exhaustive match kernel configured to:
         select a candidate answer RBE embedding from GPU memory of the GPU device;
         compare the candidate answer RBE embedding to the query RBE embedding using a similarity function;
         populate a priority queue of candidate answers found on a thread of the GPU device;
         sort the candidate answers found on the GPU device based on the priority queue populated by each thread of the GPU device; and
         return the sorted candidate answers found on the GPU device; and
   a global selection merge machine configured to:
      merge the sorted candidate answers from each GPU device; and
      return a plurality of top candidate answers.

2. The information retrieval system of claim 1, wherein the similarity function is a cosine similarity function implemented for RBE embeddings using binary arithmetic operations.

3. The information retrieval system of claim 1, wherein the trained RBE model includes a query neural network and a candidate answer neural network.

4. The information retrieval system of claim 3, wherein each of the query neural network and the candidate answer neural network includes one or more convolution layers, one or more pooling layers, and one or more feed-forward layers.

5. The information retrieval system of claim 3, wherein each of the query neural network and the candidate answer neural network includes an RBE layer configured to transform a real-valued embedding vector into one or more binary ingredient vectors.

6. The information retrieval system of claim 5, wherein the query neural network is configured to transform the real-valued embedding into a greater number of binary ingredient vectors compared to the candidate answer neural network.

7. A computational search method for retrieving computer information related to a query, the method comprising:
transforming a plurality of candidate answers to candidate answer recurrent binary embedding (RBE) embeddings using a trained RBE model configured to transform a real-valued embedding into an RBE embedding including a plurality of binary ingredient vectors;
uploading the plurality of candidate answer RBE embeddings to one or more graphical processing unit (GPU) devices;
transforming a query to a query RBE embedding using the trained RBE model;
uploading the query RBE embedding to each GPU device of the one or more GPU devices;
finding the best candidate answer RBE embeddings at each GPU device of the one or more GPU devices, wherein finding the best candidate answer RBE embeddings at a GPU device includes:
executing an exhaustive match kernel on each thread of a plurality of threads of the GPU device, wherein executing the exhaustive match kernel on a thread of a GPU device includes:
selecting a candidate answer RBE embedding from GPU memory of the GPU device;
comparing the candidate answer RBE embedding to the query RBE embedding using a similarity function; and
returning a priority queue of candidate answers found by the exhaustive match kernel;
sorting the candidate answers found on the GPU device; and
returning the candidate answers found on the GPU device;
merging the sorted candidate answers from each GPU device; and
returning a plurality of top candidate answers.

8. The computational search method of claim 7, wherein the trained RBE model includes a query neural network and a candidate answer neural network.

9. The computational search method of claim 8, wherein each of the query neural network and the candidate answer neural network includes one or more convolution layers, one or more pooling layers, and one or more feed-forward layers.

10. The computational search method of claim 8, wherein each of the query neural network and the candidate answer neural network includes an RBE layer configured to transform a real-valued embedding vector into one or more binary ingredient vectors.

11. The computational search method of claim 10, wherein the query neural network is configured to transform the real-valued embedding into a greater number of binary ingredient vectors compared to the candidate answer neural network.

12. A computational search method for retrieving computer information related to a query, the method comprising:
transforming a plurality of candidate answers to candidate answer recurrent binary embedding (RBE) embeddings using a trained RBE model configured to transform a real-valued embedding into an RBE embedding including a plurality of binary ingredient vectors;
transforming a query to a query RBE embedding using the trained RBE model;
for each candidate answer RBE embedding of a plurality of candidate answer RBE embeddings, comparing the candidate answer RBE embedding to the query RBE embedding using a similarity function;
sorting the candidate answers based on the comparisons using the similarity function; and
returning a plurality of top candidate answers.

13. The computational search method of claim 12, wherein the trained RBE model includes a query neural network and a candidate answer neural network.

14. The computational search method of claim 13, wherein each of the query neural network and the candidate answer neural network includes one or more convolution layers, one or more pooling layers, and one or more feed-forward layers.

15. The computational search method of claim 13, wherein each of the query neural network and the candidate answer neural network includes an RBE layer configured to transform a real-valued embedding vector into one or more binary ingredient vectors.

16. The computational search method of claim 15, wherein the query neural network is configured to transform the real-valued embedding into a greater number of binary ingredient vectors compared to the candidate answer neural network.

17. The computational search method of claim 12, further comprising:
uploading the plurality of candidate answer RBE embeddings to one or more graphical processing unit (GPU) devices;
uploading the query RBE embedding to each GPU device of the one or more GPU devices;
finding one or more best candidate answer RBE embeddings at each GPU device of the one or more GPU devices; and
sorting and merging the one or more best candidate answers from each GPU device.

18. The computational search method of claim 17, wherein finding the one or more best candidate answer RBE embeddings at a GPU device of the one or more GPU devices includes:
executing an exhaustive match kernel on each thread of a plurality of threads of the GPU device;
sorting the candidate answers found on the GPU device; and
returning the one or more best candidate answers found on the GPU device.

19. The computational search method of claim 18, wherein executing the exhaustive match kernel on a thread of the plurality of threads of the GPU device includes:
selecting a candidate answer RBE embedding from GPU memory of the GPU device;
comparing the candidate answer RBE embedding to the query RBE embedding using a similarity function; and
returning a priority queue of candidate answers found by the exhaustive match kernel.

20. The information retrieval system of claim 1, wherein the offline answer embedding machine is configured to recursively transform the real-valued embedding into the plurality of binary ingredient vectors in a plurality of recurrent iterations.

* * * * *